United States Patent Office 2,768,975
Patented Oct. 30, 1956

2,768,975

PROCESS OF REACTING VINYL ETHERS WITH HYDROXYTHIOLS

Richard Scharmann Schiefelbein, Austin, Tex., assignor to Jefferson Chemical Company, Inc., New York, N. Y., a corporation of Delaware No Drawing. Application September 25, 1952, Serial No. 311,533

4 Claims. (Cl. 260—609)

This invention relates to processes for reacting vinyl ethers with hydroxythiols (mercaptoalkanols) to produce ethers of thiodiglycols.

It is among the objects of this invention to provide a process for reacting vinyl ethers with hydroxythiols in the presence of catalysts which favor the formation of ethers of thiodiglycols and to provide such process which results in the production of high yields of the thiodiglycol ethers.

Other objects and advantages of this invention will be apparent from the following detailed description thereof.

It has been found that alkyl vinyl ethers, such, for example, as vinyl 2-ethyl hexyl ether, vinyl isobutyl ether, n-hexyl vinyl ether, decylvinyl ether, ethyl vinyl ether, etc. react with hydroxythiols, such as 2-mercaptoethanol, 6-mercaptohexanol, 1-thioglycerol, in the presence of amines as catalysts in accordance with the following equation:

$$ROCH=CH_2 + HSR_1OH \rightarrow ROCH_2CH_2SR_1OH$$

in which R is alkyl, preferably containing from 1 to 10 carbon atoms, and $R_1$ is an alkylene radical containing at least 2 carbon atoms in the chain between sulfur and oxygen, preferably from 2 to 6 carbon atoms.

Primary, secondary and tertiary amines may be used as catalysts. Examples of primary amines are ethyl amine, propyl amine, isopropyl amine, n-butyl amine, secondary butyl amine, amyl amine, etc. Examples of secondary amines are piperidine, dihexyl amine, diamyl amine, etc. Examples of tertiary amines are tributyl amine, triamyl amine, trihexyl amine, N-methyl piperidine, N-ethyl piperidine, N-butyl piperidine, N-amyl piperidine, etc. The catalysts are used in amounts of from 0.01% to 0.3% by weight based on the weight of the hydroxythiol, preferably from 0.02% to 0.1% by weight.

Surprisingly, it has been found that the addition of the amine to the reactants not only results in an increase in yield of the thiodiglycol ethers but also aids in controlling the reaction since the presence of the amine lessens or stops completely the usual exothermic reaction which takes place when vinyl ethers and hydroxythiols are mixed and which results in the formation of undesired high boiling products.

The reaction may be carried out at temperatures of from 25° to 150° C., preferably from 80° to 110° C. It may advantageously be carried out at atmospheric pressure. However, when using a relatively volatile amine superatmospheric pressures may be used to keep the amine in the liquid phase. Also superatmospheric pressures may be used when employing relatively low boiling vinyl ethers to avoid loss of reactants.

The proportions of the reactants can be varied over a considerable range. Equimolar amounts of the vinyl ether and hydroxythiol may be employed, although even better yields are obtained employing from 1.2 to 1.5 mols of vinyl ether per mol of hydroxythiol.

The reaction is effective to produce 3-thia-6-oxa-8-ethyldodecanol-1 by reacting 2-mercaptoethanol and vinyl 2-ethylhexyl ether. The equation for this reaction is as follows:

$$R_3OCH=CH_2 + HSCH_2CH_2OH \rightarrow R_3OCH_2-CH_2SCH_2CH_2OH$$

in which $R_3$ is ethylhexyl.

3-thia-6-oxa-8-ethyldodecanol-1 and other thiodiglycol ethers produced in accordance with this invention are useful as intermediates in the synthesis of dialkyl ethers of dithiopolyalkylene glycols which have found utility as lubricants, hydraulic fluids, and heat transfer media.

In carrying out the reaction the catalyst may be added to the hydroxythiol while agitating and the resultant mixture added to the vinyl ether. If desired, however, the catalyst may be added to the vinyl ether followed by addition of this mixture to the hydroxythiol. It is preferred to add the amine to one of the reactants and add the resultant mixture to the other reactant because in this way maximum control of the reaction due to the presence of the amine is obtained. When all of the reactants have been mixed, agitation is continued and the temperature of the reaction mixture is gradually increased to 25° to 150° C., preferably to 80° to 110° C. This temperature is maintained until the reaction is complete, usually for from 1 to 65 hours, preferably from 20 to 30 hours.

After the reaction mixture has cooled to about 20° C. it is washed with a dilute alkaline solution, e. g., a 5% by weight sodium bicarbonate solution, followed by water washes. The water is then separated from the organic layer, for example, by decantation and the latter distilled under a reduced pressure of from 0.1 to 10.0 mm. of mercury to obtain a pure product. If a product of high purity is not required, the distillation under reduced pressure may be omitted.

The following examples are illustrative of the invention, but are not to be regarded as limiting it in any way. In these examples all parts are by weight.

*Example I*

A mixture of 0.17 part of piperidine and 234.3 parts (3.0 mols) of 2-mercaptoethanol is added to 703.3 parts (4.5 mols) of vinyl 2-ethylhexyl ether while stirring. The resulting mixture is kept at 90° C. for 24 hours. The reaction mixture is then washed twice with 200 parts of a sodium bicarbonate solution and 3 times with water and the organic layer separated from the aqueous layer. The organic layer is distilled resulting in a 95% yield of 3-thia-6-oxa-8-ethyldodecanol-1.

For comparative purposes the same reactants were reacted under substantially the same conditions, except for the omission of the catalyst. A yield of only 34.5% of 3-thia-6-oxa-8-ethyldodecanol-1 was obtained.

*Example II*

A mixture of 0.06 part of tri-n-butyl amine and 78.1 parts (1.0 mol) of 2-mercaptoethanol is added to 234.4 parts (1.5 mols) of vinyl 2-ethylhexyl ether. The resultant mixture is heated at 90° C. for 24 hours. After washing, as in Example I, the organic layer is distilled to give a yield of 91.6% 3-thia-6-oxa-8-ethyldodecanol-1.

*Example III*

78.1 parts of 2-mercaptoethanol (1.0 mol) and 156.3 parts of vinyl 2-ethylhexyl ether (1.0 mol) are reacted in the presence of a small amount (0.036 parts) of piperidine at a temperature of 80° C. for 65 hours. A yield of 86.4% of 3-thia-6-oxa-8-ethyldodecanol-1 is obtained.

Example IV

A mixture of 39 parts (0.5 mol) of 2-mercaptoethanol and 0.03 part of n-butyl amine is added slowly to 117.2 parts (0.75 mol) of vinyl 2-ethylhexyl ether. The resulting mixture is heated at 90° C. for 24 hours, and then washed twice with aqueous sodium bicarbonate and three times with water. The product is then distilled to give an 82.6% yield of 3-thia-6-oxa-8-ethyldodecanol-1.

Example V

A mixture of 39 parts (0.5 mol) of mercaptoethanol and 0.03 part of piperidine is added to 75 parts (0.75 mol) of vinyl isobutyl ether, and the resulting mixture is heated at 90° C. for 15 hours. The product is washed first with sodium bicarbonate solution and then with water. After vacuum distillation the yield of 3-thia-6-oxa-8-methylnonanol-1 is about 54%.

If the catalyst is omitted in this example, the yield of 3-thia-6-oxa-8-methylnonanol-1 is only 37%.

It is to be understood that this invention is not restricted to the present disclosure, except as defined by the appended claims.

What is claimed is:

1. The process which comprises reacting a vinyl ether having the formula $ROCH=CH_2$ in which R is alkyl containing from 1 to 10 carbon atoms with a hydroxythiol having the formula $HSR_1OH$ in which $R_1$ is an alkylene radical containing from 2 to 6 carbon atoms in the chain between sulfur and oxygen in the presence of an amine as catalyst to produce an ether of a thiodiglycol having the formula $ROCH_2CH_2SR_1OH$ in which R and $R_1$ have the values hereinabove specified.

2. A process according to claim 1 in which said amine is present in the amount of 0.01% to 0.3% and said reaction is conducted at a temperature in the range of 25° to 150° C.

3. A process comprising catalytically producing a thiodiglycol ether in a yield of at least 54% by reacting between 1 and 1.5 mols of a vinyl ether selected from the group consisting of vinyl 2-ethylhexyl ether and vinyl isobutyl ether with 1 mol of 2-mercaptoethanol at a temperature in the range of 25° to 150° C. and in the presence of an amine catalyst for the reaction.

4. A process in accordance with claim 3 wherein said amine catalyst is selected from the group consisting of piperidine, n-butylamine, and tri-n-butylamine.

References Cited in the file of this patent

UNITED STATES PATENTS

| | | |
|---|---|---|
| 2,191,564 | Graenacher et al. | Feb. 27, 1940 |
| 2,562,844 | Harman et al. | July 31, 1951 |